United States Patent

Mishima et al.

[11] Patent Number: 5,189,873
[45] Date of Patent: Mar. 2, 1993

[54] COMBINED CYCLE POWER PLANT WITH WATER TREATMENT

[75] Inventors: Nobuyoshi Mishima; Yoshiki Noguchi, both of Hitachi, Japan

[73] Assignee: Hitachi, Ltd., Tokyo, Japan

[21] Appl. No.: 758,009

[22] Filed: Sep. 12, 1991

[30] Foreign Application Priority Data

Sep. 12, 1990 [JP] Japan .................. 2-240011

[51] Int. Cl.$^5$ .............................. F02C 6/00
[52] U.S. Cl. .................. 60/39.182; 60/646; 60/657
[58] Field of Search .......... 60/39.182, 646, 657; 122/398, 401, 431, 451 R; 137/544

[56] References Cited

U.S. PATENT DOCUMENTS

| | | | |
|---|---|---|---|
| 3,572,036 | 3/1971 | Beckman et al. | 60/646 |
| 3,691,760 | 9/1972 | Vidal et al. | 60/39.182 |
| 3,769,795 | 11/1973 | Rostrom | 122/401 |
| 4,055,048 | 10/1977 | Reed | 60/646 |
| 4,386,498 | 6/1983 | Lee et al. | 60/646 |
| 4,441,028 | 4/1984 | Lundberg | 60/39.182 |
| 4,510,755 | 4/1985 | Gartmann et al. | 60/657 |
| 4,991,391 | 2/1991 | Kosinski | 60/39.182 |

FOREIGN PATENT DOCUMENTS

| | | |
|---|---|---|
| 0114837 | 9/1980 | Japan . |
| 0015704 | 1/1983 | Japan . |
| 0579442 | 11/1977 | U.S.S.R. . |

Primary Examiner—Richard A. Bertsch
Assistant Examiner—Howard R. Richman
Attorney, Agent, or Firm—Antonelli, Terry, Stout & Kraus

[57] ABSTRACT

A combined cycle power plant includes a water treatment apparatus for removing iron oxides in condensate provided in a partial condensate flow line for selectively flowing a portion of the condensate into a condenser. The partial condensate flow line recirculates a portion of the condensate from and to the condenser through the condensate feed line connected to a boiler utilizing exhaust gas from a gas turbine. A heating apparatus heats the condensate to reduce the concentration of oxygen by deaeration, and a drum blow off water recovery line is connected to the boiler and to the condenser for blowing off part of the condensate in the boiler.

9 Claims, 2 Drawing Sheets

COMBINED CYCLE POWER PLANT WITH WATER TREATMENT

BACKGROUND OF THE INVENTION

The present invention relates to a combined cycle power plant and, more particularly, to a combined cycle power plant in which iron oxides in condensate of a condenser or iron oxides in drum water of an exhaust heat recovery boiler can be effectively removed.

A conventional combined cycle power plant provided with an apparatus for removing iron oxides in condensate is disclosed in Japanese patent publication JP-B-63-59006 (1988). In the conventional plant, a gas turbine is supplied with fossil fuel and air to burn the fuel and driven by a high temperature combustion gas to rotate a generator thereby to effect a first stage power generation. Next, a high temperature exhaust gas from the gas turbine is fed to a boiler in which steam is generated, and the exhaust gas having been lowered in temperature through the generation of the steam is exhausted. The steam is fed to a steam turbine to drive it and to effect a second stage power generation by a generator connected to the steam turbine. Subsequently, an exhaust steam from the steam turbine is sent to a cooler in which the steam is caused to contact indirectly with a cooling water and cooled to be condensate. The condensate is fed to the boiler by a feed pump through a condensate demineralizer which employs H type cation exchange resin and OH type anion exchange resin. The condensate is treated of by the condensate demineralizer.

The conventional combined cycle power plant is constructed so that all the condensate to be fed to the boiler passes through the condensate demineralizer. Therefore, the total pump head of the feed pump increases, and power consumption of the feed pump also increases. Further a larger capacity demineralizer is required in this case because all the condensate to be fed to the boiler passes through the demineralizer.

In another conventional combined cycle power plant, a condensate recirculation line for recirculating a condensate in a condenser and a blow off line for removing iron oxides from feed water or condensate is provided in a condensate feed line for feeding condensate from a steam turbine to an exhaust heat recovery boiler at a downstream side of a feed pump mounted on the condensate feed line. At starting time of the power plant, the concentration of oxygen dissolved in the condensate is high, about several thousand ppb; the condensate can not be fed to the exhaust heat recovery boiler without any treatment of the condensate. Therefore, deaeration of the condensate is effected to the extent that requirement of the exhaust heat recovery boiler is satisfied, by recirculating the condensate from the condenser to the condenser through the condensate recirculation line and heating the condensate in the condenser with auxiliary steam fed to the condenser through an auxiliary steam line.

In this power plant, iron oxides in the condensate are removed by blowing off a part of condensate. For example, in the combined cycle power plant of around 1000 MW, a condensate of about 80 m$^3$ is blown off for about 50 minutes at the start up of the plant. The condensate blown off is compensated by introducing make-up water into the condenser. As a result, a reduction effect of the dissolved oxygen is lowered by the introduction of the auxiliary steam, which results in increasing of the starting time of the power plant.

SUMMARY OF THE INVENTION

An object of the invention is to provide a combined cycle power plant which is able to remove iron oxides in the condensate with a miniaturized condensate treatment apparatus without increasing the power consumption of a condensate pump and a the starting time of the power plant.

Another object of the present invention is to provide a combined cycle power plant which can remove effectively iron oxides in the condensate when deaeration by the condenser is effected without increasing in the total head of a condensate pump.

The present invention resides in a combined cycle power plant comprising a gas turbine, a generator operatively connected to the gas turbine, an exhaust heat recovery boiler heating a condensate with exhaust gas from the gas turbine, a steam turbine driven by the steam generated in the boiler, a generator operatively connected to the steam turbine, a condenser condensing an exhaust steam from the steam turbine, a condensate feed line, including the condenser, the boiler and a condensate pump for feeding the condensate in the condenser into the exhaust heat recovery boiler, a partial condensate flow line connected to the condenser and to the condensate feed line at a downstream side of the condensate pump for selectively sending a part of condensate in the condensate feed line to the condenser, and a condensate or water treatment apparatus provided in the partial condensate flow line for removing iron oxides in the condensate.

According to an aspect of the present invention the partial condensate flow line is a condensate recirculation line, connected to the condenser and to the condensate feed line at a downstream side of the condensate pump, for recirculating a part of the condensate to deaerate the condensate in the condenser, using auxiliary steam to heat the condensate. The water treatment apparatus is preferably an electromagnetic filter or a hollow-fiber filter.

In accordance with the present invention, iron oxides can be removed during deaeration of the condenser. The condenser is evacuated, so that oxygen, dissolved in the condensate, can easily be removed by heating the condensate to raise the temperature of the condensate by, for example, 2° to 3° C. greater than a temperature of the condensate. In order to effectively deaerate, the condensate is recirculated, so that the iron oxides in the condensate in the recirculation line can be removed simultaneously with the deaeration by providing the water treatment apparatus therein.

This construction of the combined cycle power plant can remove iron oxides in the condensate with the miniaturized water treatment apparatus without increasing the capacity of the condensate pump.

According to another aspect of the invention, the partial condensate flow line is a drum blow off water line connected to a drum of the exhaust heat recovery boiler and to the condenser for blowing off a part of condensate in the drum. A water treatment apparatus is mounted on the drum blow off water line. The pressure difference is large between the boiler and the condenser so that the condensate is easily blown off into the condenser, and iron oxides in the condensate supplied to the condenser are removed by the water treatment apparatus provided on the drum blow off water line.

DESCRIPTION OF THE INVENTION

Embodiments of the present invention will be described hereunder with reference to the drawings.

Figure 1:
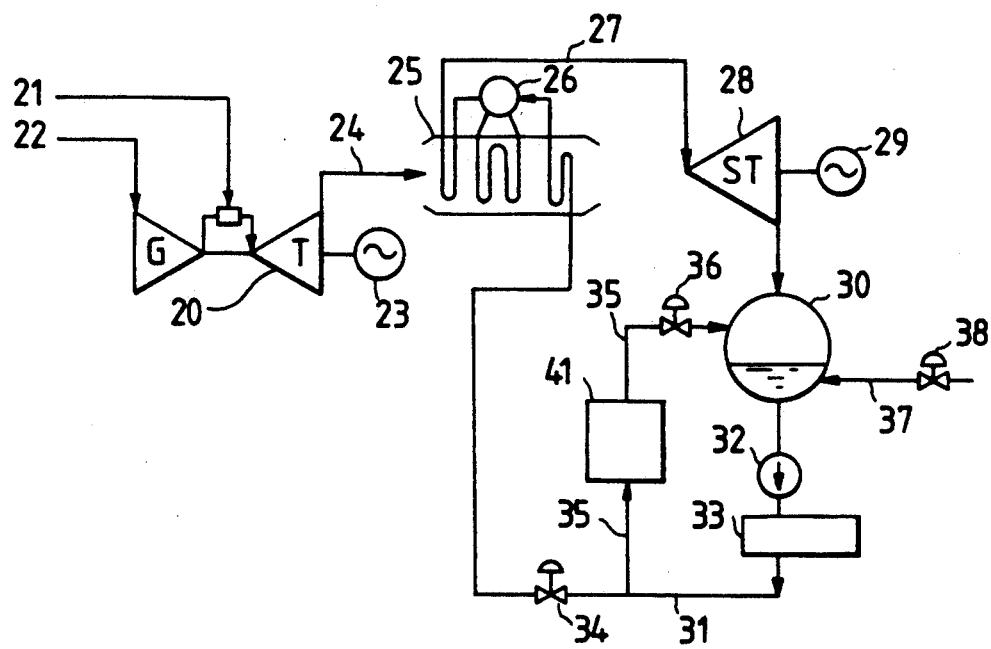
FIG. 1 is a schematic diagram of a combined cycle power plant of an embodiment of the invention.

An embodiment of a combined cycle power plant according to the invention is illustrated in FIG. 1.

In FIG. 1, the combined cycle power plant includes a gas turbine 20 operated by a combustion gas produced by combustion of fuel 21 with air 22, a generator 23 connected to the gas turbine 20, an exhaust heat recovery boiler 25 having a drum 26 containing therein a condensate and heating the condensate with an exhaust gas from the gas turbine 20 through an exhaust gas line 24, a steam turbine 28 driven by steam generated in the boiler 25 and sent through a steam line 27, a generator 29 connected to the steam turbine 28, a condenser 30 for condensing the steam exhausted from the steam turbine 28, a condensate feed line 31 which is inclusive of the condenser 30 and the drum 26 of the boiler 25 and provided with a condensate pump 32, a gland steam condenser 33 and a feed water (condensate) adjusting valve 34, a condensate recirculation line 35 with a valve 36 connected to the condenser 30 and the condensate feed line 31 at a downstream side of the condensate pump 32 and at an upstream side of the feed water adjusting valve 34, and a water treatment apparatus 41 provided in the condensate recirculation line 35.

The condenser 30 has an auxiliary steam line 37, with a valve 38, as a heating means.

At a starting time of the power plant, the concentration of oxygen dissolved in the condensate is reduced by deaeration. The deaeration is effected by heating the condensate in the condenser 30 with auxiliary steam introduced into the condenser 30 through the auxiliary steam line 37 and by recirculation of the condensate through the recirculating line 35 by action of the condensate pump 32. When the concentration of the dissolved oxygen in the condensate reaches an allowable extent, the valve 36 is closed and the condensate begins to be fed to the drum 26.

In this embodiment, the water treatment apparatus 41 is provided in the condensate recirculation line 35. Therefore, during the recirculation of the condensate at the starting time of the power plant, iron oxides in the condensate are removed by the water treatment apparatus 41. Namely, at the starting time of the power plant, the condensate in the condenser 30 is sent to the water treatment apparatus 41 by the condensate pump 32 through the gland steam condenser 33, the condensate feed line 31 and the condensate recirculation line 35, and iron oxides in the condensate are removed by the water treatment apparatus 41 as the condensate passes therethrough. Subsequently, the treated condensate from which iron oxides have been removed is returned to the condenser 30 through the condensate recirculation line 35 and the condensate recirculation valve 36.

During this recirculation of the condensate auxiliary steam is supplied into the condenser 30 through the auxiliary steam line 37, with the valve 38 being opened. The auxiliary steam heats, in a vacuum, the condensate in the condenser 30 and deaerates the condensate to remove oxygen dissolved in the condensate to satisfy the required conditions of the exhaust heat recovery boiler 25. After iron oxides in the condensate have been removed and the concentration of the dissolved oxygen in the condensate has been reduced, the condensate recirculation valve 36 and the auxiliary steam valve 38 are closed; the water feed adjusting valve 34 is opened; and the condensate in the condenser 30 is fed to the drum 26 of the exhaust heat recovery boiler 25 through the condensate pump 32, the gland steam condenser 33, the condensate feed line 31 and the feed water adjusting valve 34.

In this embodiment, iron oxides in the condensate are removed by the water treatment apparatus 41 provided in the condensate recirculation line 35, so that a pressure difference necessary for removing iron oxides is smaller than with the conventional heat recovery boiler which is previously mentioned. Therefore the condensate is adequate when the total pump head is small, so that power consumption can be reduced.

Further, iron oxides in the condensate are removed by the water treatment apparatus 41, so that it is not necessary to blow off the condensate in order to remove iron oxides therein. Therefore, it is unnecessary to blow off the condensate in which the dissolved oxygen concentration has been reduced, the starting time of the power plant can be reduced and the amount of pure water required can also be reduced.

As the water treatment apparatus 41, an electromagnetic filter 41a or a hollow-fiber filter 41b is preferable.

Figure 2A:
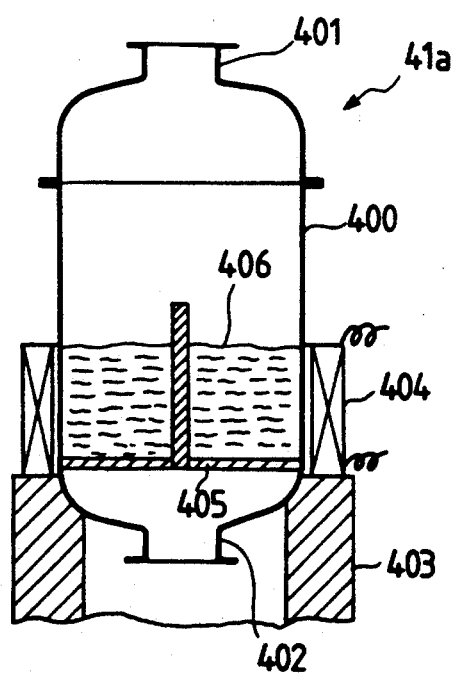
FIG. 2a is a sectional view of an electromagnetic filter.

The electromagnetic filter 41a is shown in FIG. 2a.

In FIG. 2a, the electromagnetic filter 41a comprises a casing 400, having an outlet 401 and an inlet for condensate, and supported by a support 403, a perforated support plate 405 disposed in the casing 400, spiral steel wool 406 disposed on the support plate 405, and an electromagnetic coil 404 wound around the casing 400. When the condensate passes through the wool 406 while the coil 404 is energized, iron oxides are caught by the steel wool 406, and the concentration of iron oxide in the condensate which has passed through the steel wool 406 is reduced.

The iron oxides caught by the steel wool 406 can be separated from the steel wool 406 by deenergizing the coil 404 when it is necessary. The separated iron oxides are discharged out of the casing 400 together with the condensate.

Figure 2B:
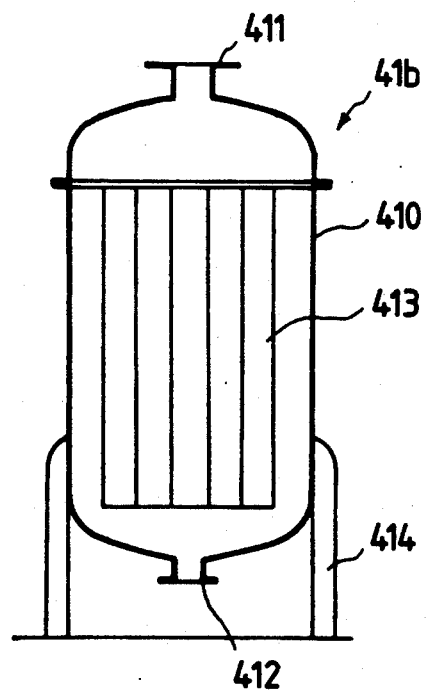
FIG. 2b is a sectional view of a hollow-fiber filter.

In FIG. 2b, the hollow-fiber filter 41b is illustrated. In FIG. 2b, the filter 41b comprises a casing 410 supported on a support frame 414, and having an outlet 411 and an inlet 412, and a plurality of hollow-fibers 413, each of which is a very thin hollow tubular member having a plurality of holes in the wall portion.

In this filter 41b, water or condensate to be treated enters the interior of the casing 410 at the inlet 412, the water which has entered in the casing 410 penetrates into the interior of the hollow fibers through the fine holes at the wall portion while iron oxides in the water are prevented to enter the hollow fibers, and the water which has entered in the hollow fibers is collected at the outlet 411 and goes out therefrom.

In the above-mentioned manner, iron oxides or foreign matters included in the water or condensate are removed.

Figure 3:
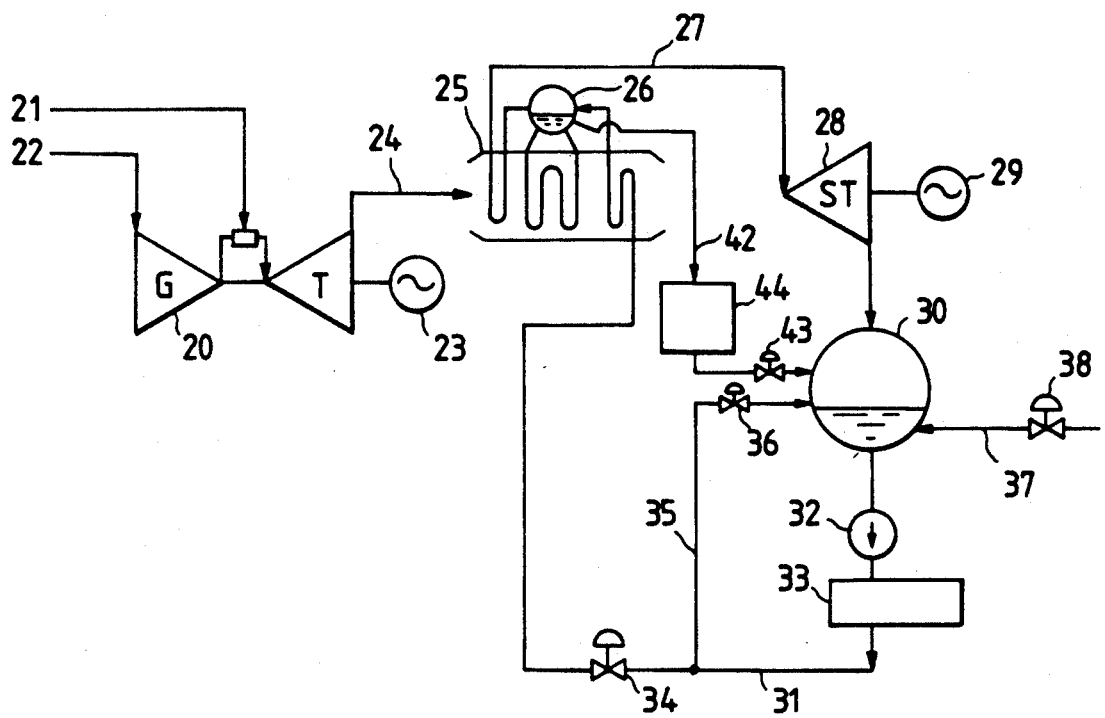
FIG. 3 is a schematic diagram of a combined cycle power plant of another embodiment of the invention.

Another embodiment will be described hereunder referring to FIG. 3 showing a system diagram of a combined cycle power plant.

In FIG. 3, the same parts or members have the same reference numerals as in FIG. 1 and the description of the same parts or members is omitted. In this embodiment, the drum 26 of the exhaust heat recovery boiler 25 is connected to the condenser 30 by a drum blow off water recovery line 42 with a drum blow off water recovery valve 43. A water treatment apparatus 44 is provided in this drum blow off water recovery line 42. An example of the water treatment apparatus 44 is an electromagnetic filter as shown in FIG. 2a or a hollow-fiber filter as shown in FIG. 2b, both of which apparatus are small in necessary pressure difference between an upstream sides and a downstream side of the water treatment apparatus 44.

In this embodiment, when the quality of drum water in the drum 26 of the exhaust heat recovery boiler 25 is worsened, a part of the drum water is taken up, the drum water is introduced in the water treatment apparatus 44 through the drum blow off water recovery line 42, and iron oxides in the drum water are removed. The treated water from which iron oxides are removed is returned to the condenser 30 through the drum blow off water recovery valve 43.

This embodiment is the same in construction and operation as the embodiment shown in FIG. 1 except that the drum blow off water recovery line 42 having the water treatment apparatus 44 and the valve 43 is provided instead of the water treatment apparatus 41 provided in the condensate recirculation line 35, and iron oxides included in the water or condensate are removed by the water treatment apparatus 44 when part of the drum water is blown off into the condenser 30.

Further another embodiment of the invention will be described hereunder referring to FIG. 4.

Figure 4:
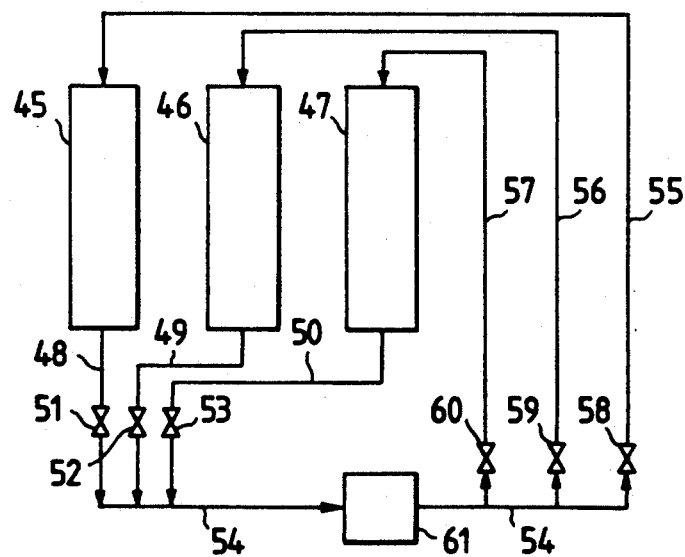
FIG. 4 is a schematic diagram of a series of trains of combined cycle power plants of a further embodiment of the invention.

In FIG. 4 a plurality of trains of combined cycle power plants 45, 46, 47 are shown. Each combined cycle power plant 45, 46, 47 is the same as one in FIG. 1 or FIG. 3. The combined cycle power plants 45, 46 and 47 have water take up lines 48, 49 and 50 and water return lines 55, 56 and 57 connected thereto, respectively. The water take up lines have change-over valves 51, 52 and 53, respectively, and are connected to a single common water recirculation line 54. The common water recirculation line 54 is provided with a water treatment apparatus 61 and connected, at a downstream side of the water treatment apparatus 61, to the water return lines 55, 56 and 57 each of which has a change-over valve 58, 59, 60.

The water taking up lines 48, 49, 50, the water recirculation line 54 and the water return lines 55, 56, 57 correspond to the condensate recirculation line 35 of the embodiment shown in FIG. 1, or to the drum blow off water recovery line 42 of the embodiment shown in FIG. 3.

As the water treatment apparatus 61, an electromagnetic filter, as shown in FIG. 2a, or a hollow fiber filter, as shown in FIG. 2b, may be used, with the filters being adapted to as to provide only a small pressure differential necessary to remove the iron oxides, which pressure differential occurs by virtue of the presence of the filters.

In this embodiment, when iron oxides in the condensate in the condenser of each combined cycle power plant 45, 46, 47 or in the drum water in the exhaust heat recovery boiler are removed, the change-over valves 51, 52, 53 of the water taking up lines 48, 49, 50 and the change-over valves 58, 59, 60 of the water returning lines 55, 56, 57 are opened. By this valve opening, water which is to be treated is introduced from the combined cycle power plants 45, 46, 47 to the water treatment apparatus 61 through the water take up lines 48, 49, 50 and the water recirculation line 54. In the water treatment apparatus 61, iron oxides in the water are removed. The water having been treated by the water treatment apparatus 61 is returned to the combined cycle power plants 45, 46, 47 through the water recirculation line 54, the change-over valves 58, 59, 60 and the water returning lines 55, 56, 57.

Further, in this embodiment, water treatment of one or two of the plurality of trains of combined cycle power plants can be selectively effected by selectively opening a pair of the change over valves 51 and 58, a pair of the change-over valves 52 and 59 and a pair of the change-over valves 53 and 60 according to the selection of the combined cycle power plant whose water is to be treated.

The water treatment apparatus 61 is common to the combined cycle power plants 45, 46, 47, so that miniaturization of the water treatment apparatus for the plurality of trains of combined cycle power plants and installation cost reduction can be effected.

What is claimed is:

1. A combined cycle power plant comprising:

a gas turbine;

a generator connected to said gas turbine to generate electric power;

an exhaust heat recovery boiler for heating a condensate with exhaust combustion gas from said gas turbine to generate steam;

a steam turbine driven by the steam generated by said exhaust heat recovery boiler;

a generator connected to said steam turbine to generate electric power;

a condenser for condensing steam exhausted from said steam turbine to form a condensate in said condenser at a predetermined time;

a condensate feed line having a condensate pump for feeding the condensate from said condenser to said exhaust heat recovery boiler, and a stop valve disposed at a downstream side of said condensate pump;

deaerating means for deaerating the condensate in said condensate feed line, said deaerating means comprising said condenser, heating means connected to said condenser for heating the condensate in said condenser at a predetermined time, and a condensate recirculation line having a valve and connected to said condenser and to said condensate feed line at an upstream side of said stop valve and at a downstream side of said condensate pump for recirculating the condensate from and to said condenser via a part of said condensate feed line; and a water treatment apparatus provided in said condensate recirculation line for removing iron oxides from the condensate.

2. The combined cycle power plant according to claim 1, wherein said heating means comprises an auxiliary steam line including a valve and connected to said condenser for heating the condensate in said condenser at a starting time of the power plant.

3. The combined cycle power plant according to claim 2, wherein said water treatment apparatus includes an electromagnetic filter provided in said condensate recirculation line.

4. The combined cycle power plant according to claim 2, wherein said water treatment apparatus is a hollow-fiber filter.

5. A combined cycle power plant comprising:
a gas turbine;
a generator connected to said gas turbine to generate electric power;
an exhaust heat recovery boiler for recovering heat in the exhaust gas from said gas turbine and heating condensate to generate steam;
a steam turbine driven by the steam generated in said exhaust heat recovery boiler;
a generator connected to said steam turbine;
a condenser for cooling steam exhausted from said steam turbine to condense the steam;
a condensate feed line between said condenser and said exhaust heat recovery boiler for feeding condensate from said condenser into said exhaust heat recovery boiler, said condensate feed line having a condensate pump;
a partial condensate flow line for selectively transmitting a part of the condensate from said condensate feed line downstream of said condensate pump to said condenser; and
a water treatment apparatus provided in said partial condensate flow line for removing iron oxides in the condensate;
wherein said partial condensate flow line is a drum blow-off water recovery line connected to a drum of said exhaust heat recovery boiler and to said condenser for blowing off a part of the condensate in the drum and recovering the condensate blown off from said drum of said boiler into said condenser, said water treatment apparatus being provided in said drum blow-off water recovery line so as to remove iron oxide in said blown-off condensate.

6. The combined cycle power plant according to claim 5, wherein said water treatment apparatus is one of an electromagnetic filter and a hollow-fiber filter.

7. A combined cycle power plant comprising;
a gas turbine;
a generator connected to said gas turbine to generate electric power;
an exhaust heat recovery boiler, having a drum containing therein a condensate, for heating the condensate with exhaust combustion gas from said gas turbine to generate steam;
a steam turbine driven by the steam generated by said exhaust heat recovery boiler;
a generator connected to said steam turbine to generate electric power;
a condenser for condensing the steam exhausted from said steam turbine to form a condensate;
a condensate feed line including a condensate pump for feeding the condensate from said condenser to said drum of said exhaust heat recovery boiler;
a condensate recirculation line, connected to said condenser and to said condensate feed line at a downstream side of said condensate pump, for recirculating the condensate in said condenser from and to said condenser via a part of said condensate feed line;
a drum blow-off water line connected to said drum of said exhaust heat recovery boiler and to said condenser for selectively blowing off a part of the condensate in said drum into said condenser; and
a water treatment apparatus provided in said drum blow-off water line for removing iron oxides in the condensate blown-off into said condenser.

8. The combined cycle power plant according to claim 7, wherein said water treatment apparatus includes one of an electromagnetic filter and hollow-fiber filter.

9. A combined cycle power plant comprising a plurality of trains of combined cycle power plants, each of the trains of the combined cycle power plants comprises:
a gas turbine;
a generator connected to and driven by said gas turbine,
an exhaust heat recovery boiler having a drum containing a condensate therein for heating the condensate with exhaust combustion gas from said gas turbine to generate steam,
a steam turbine driven by the steam generated by said exhaust heat recovery boiler,
a generator connected to and driven by said steam turbine,
a condenser for condensing steam exhausted from said steam turbine,
a condensate feed line having a condensate pump for feeding condensate in said condenser to said drum of said exhaust heat recovery boiler, and
a condensate recirculation line connected to said condenser and to said condensate feed line at a downstream side of said condensate pump for recirculating a portion of the condensate in said condenser from said
wherein each of the trains of the combined power plants have a drum blow-off water recovery line through which the condensate in said drum is selectively blown-off and the blown-off condensate is recovered in said condenser, and a single water treatment apparatus is common to all of the trains of said combined cycle power plants is connected to said drum blow-off water recovery line for removing iron oxides in the condensate blown-off into said condenser.

* * * * *